(12) United States Patent
Henderson

(10) Patent No.: US 7,549,553 B2
(45) Date of Patent: Jun. 23, 2009

(54) RAVEN ROUND POLYETHYLENE WATER METER BOX WITH STACKABLE OUTSIDE BASE FLANGE AND FRICTION LUGS

(75) Inventor: Donald James Henderson, Meridian, ID (US)

(73) Assignee: Henderson Donald James, Caldwell, ID (US)

( * ) Notice: Subject to any disclaimer, the term of this patent is extended or adjusted under 35 U.S.C. 154(b) by 153 days.

(21) Appl. No.: 11/216,327

(22) Filed: Aug. 31, 2005

(65) Prior Publication Data

US 2007/0241112 A1    Oct. 18, 2007

Related U.S. Application Data

(60) Provisional application No. 60/622,894, filed on Oct. 28, 2004.

(51) Int. Cl.
    *B65D 88/76* (2006.01)
(52) U.S. Cl. ........................ 220/484; 206/519
(58) Field of Classification Search ................. None
    See application file for complete search history.

(56) References Cited

U.S. PATENT DOCUMENTS

| | | | | |
|---|---|---|---|---|
| 4,153,176 A | * | 5/1979 | Carson | 220/484 |
| 5,823,577 A | * | 10/1998 | Johnston | 285/30 |
| 6,460,563 B2 | * | 10/2002 | Olson et al. | 137/364 |
| 6,712,086 B1 | * | 3/2004 | Fails | 137/15.03 |
| 7,243,810 B2 | * | 7/2007 | O'Brien et al. | 220/484 |

* cited by examiner

*Primary Examiner*—Stephen Castellano

(57) ABSTRACT

Freight costs are escalating as a result of oil prices with no end in sight. The ability to transport twice as many boxes per trip and not suffer disassembly damages will be a great innovation, also the reduced consumption of fossil fuels; air pollution and land fill due to broken boxes. Inventory space is at a premium as land costs and taxes escalate, being able to inventory twice as many boxes in the same space will provide distributors with more available product increasing sales and profit. Because of the space saved, distributors will be able to purchase in truckload quantities taking advantage vendor paid freight and increased toackload discounts. Lugs over the mouse holes provide a new ease of removal from stacked units. Lugs provide a very small area of contact between stacked boxes eliminating friction caused by overlapping exterior boxes that are in total contact with the interior box. Lugs provide just the right amount of stability for stacking and shipping but allowing easy disassembly at job site.

1 Claim, 5 Drawing Sheets

US 7,549,553 B2

RAVEN ROUND POLYETHYLENE WATER METER BOX WITH STACKABLE OUTSIDE BASE FLANGE AND FRICTION LUGS

CROSS REFERENCE TO PROVISIONAL PATENT

Priority claimed to provisional application Ser. No. 60/622,894 filed Oct. 28, 2004.

STATEMENT REGARDING FEDERALLY SPONSORED RESEARCH OR DEVELOPMENT

Not applicable.

BACKGROUND OF THE INVENTION

Each home, apartment, office building, manufacturing facility any building with running water that a water utility or city water department provides (not wells) with drinking water is metered or will be metered. Metering provides the utility or city with a way of charging for the water used. Example, an 8" water mainline is buried in the street in front of a building, then a 1" corporation stop is attached to the pipe and connected to a 1" Copper or HDPE pipe. This is called a water service. The service pipe, still under ground, is then routed to a water meter and backflow device located between the water main and the building. The water meter and back flow device are below ground so in need of a void area free of dirt where the meter can be read, maintained and the building billed for water used. Meter boxes are used to provide this underground area; a hole is excavated to the depth of the service and the meter box installed and backfilled. The meter setter is now installed with the meter and backflow valve. Then the 1" pipe is routed to the building completing the water service. The meter box is open at the bottom and the top with a lid on the top. Subdivisions require one service for each house.

BRIEF SUMMARY OF THE INVENTION

Invention has Two Parts.
(I) The External Base Flange and
(II) The Two Friction Lugs
(I). Round water meter boxes are manufactured from high-density polyethylene with the top diameter four inches smaller than the bottom diameter (ex. of one size is 20"×24") they are coned so they will stack (telescope) one into the other to increase the amount of boxes per truckload thereby reducing freight costs per unit. Stacking also stabilizes the load.

Round water meter boxes are all manufactured with a flange around the inside diameter of the top of the box and around the inside diameter at the base of the box. Both flanges protrude one and a half inches into the interior circumference of the box. They are present to provide support against external earth loads trying to implode the box. Since the base flange inside diameter (21") is smaller than the inside diameter of the meter box (24") this reduces the amount of boxes that can be stacked (telescoped) one in the other, until the stack reaches maximum height limit for truck transportation.

What I would like to change and patent, from current standard manufacturing, is to relocate the base flange from inside of the box to the outside of the box. With the supporting flange on the exterior, the base inside is increased to a full 24" allowing almost all of the box to slide into the interior of the telescoping box. This will allow 13 units to stack into the space where 6 were previously stacked. Transporting over twice the amount of water meter boxes for the same price but still providing the necessary I beam support (flange).

Another advantage of the interior flange removal is taking the telescoped boxes apart at the installation point. Polyethylene creeps under load so when the boxes are telescoped then inventoried, especially at elevated temperatures for a long time then transported from factory to distributor yard and ultimately to the installation point, the inside flanges are forced, due to gravity and vibration, into the exterior wall of the boxes inside of them, creating an indentation the flange rests in. With the flange indented into the interior box they are almost impossible to take apart. Contractors use sledgehammers to pound them apart causing many to be damaged and rejected especially in cold weather.

EXAMPLE

48" long meter box with inside flange stack 5 high ×4 wide by 12 long=240 boxes/truck @ 2,000 $/truck=8.33 $/box. 48" long meter box with outside flange stack 13 high ×4 wide by 12 long=624 boxes per truck @ 2,000 $/truck=3.85 $/box. Exterior flange idea will save $5.12/per box. Transporting twice as many boxes per load will eliminate the fuel consumed by one more truck.

With fuel costs increasing, freight charges and surcharges on delivered boxes has doubled in the last two years and projected to escalate in the face of diminishing supplies, territorial disputes, China/India consumption and hurricanes striking the Gulf Coast. Freight costs, as never before, have created the need for new packaging innovations. My idea of moving the inside flange to the outside will cut freight costs in half keeping me in business.

(II). Two Lugs (3" long by 1" wide protrusions above each mouse hole) on each side, provide a point where the outside box slides over the lug creating a small friction point that allows the box to slide off with little effort but creates enough friction to stabilize the box during transportation. Without this lug the entire circumference of the inside box would be in contact with the entire circumference of the outside box creating enough friction to again require force to separate them.

C. Friction Lugs placed on the box exterior above both mouse holes, they are 3" long by 1" wide and protrude 1" from the meter box outside wall.

D. Mouse holes. (One on each side, holes for water pipe to enter water meter box).

Figure 1:
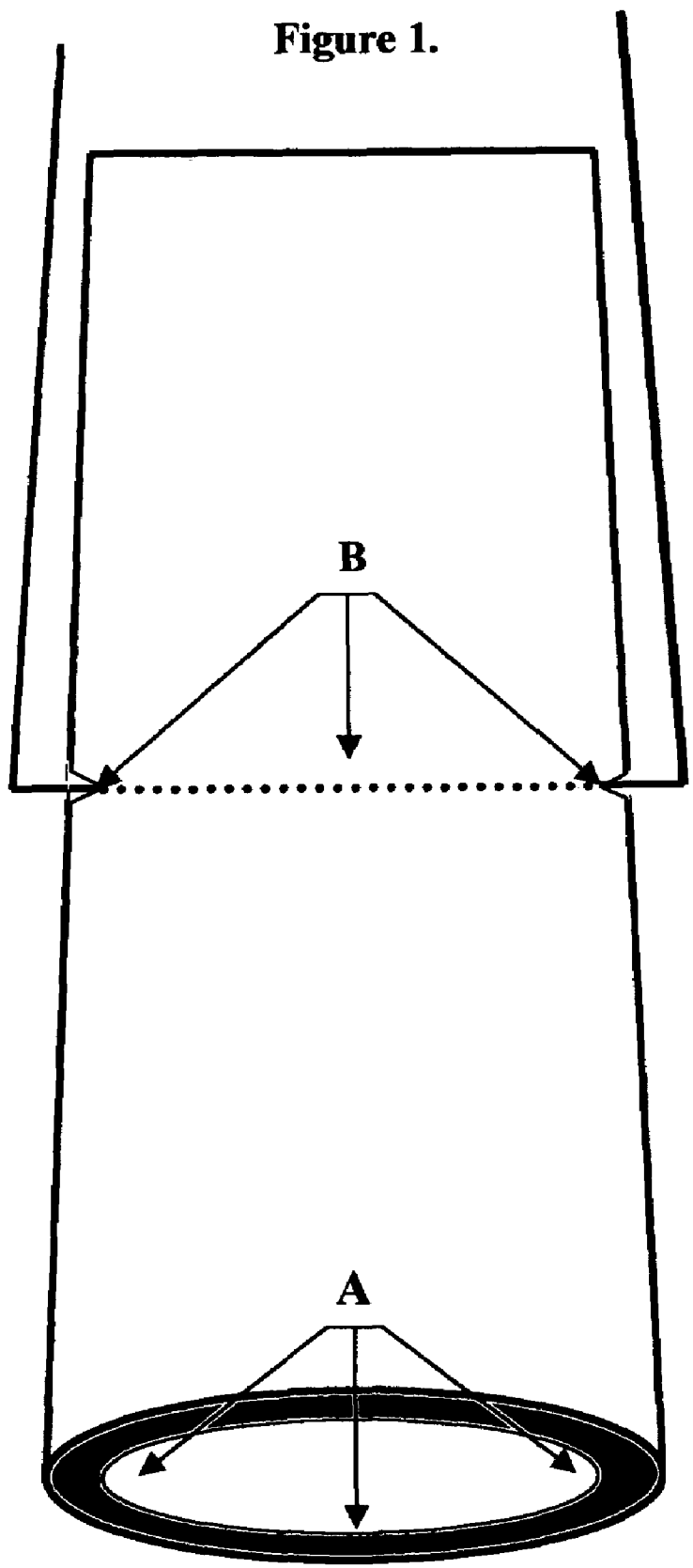
FIG. 1. Box is tilted on side looking up at base of box. Page 9.
  Standard round meter box showing the base flange on the inside of the box.
  A. With base flange on the inside of the box, the inside diameter is reduced from an inside diameter of 24" to an inside diameter of 21".
  B. Inside flanges are forced into the exterior wall of the inside box forming a circumferential groove the flange rests in making separation difficult.
Figure 2:
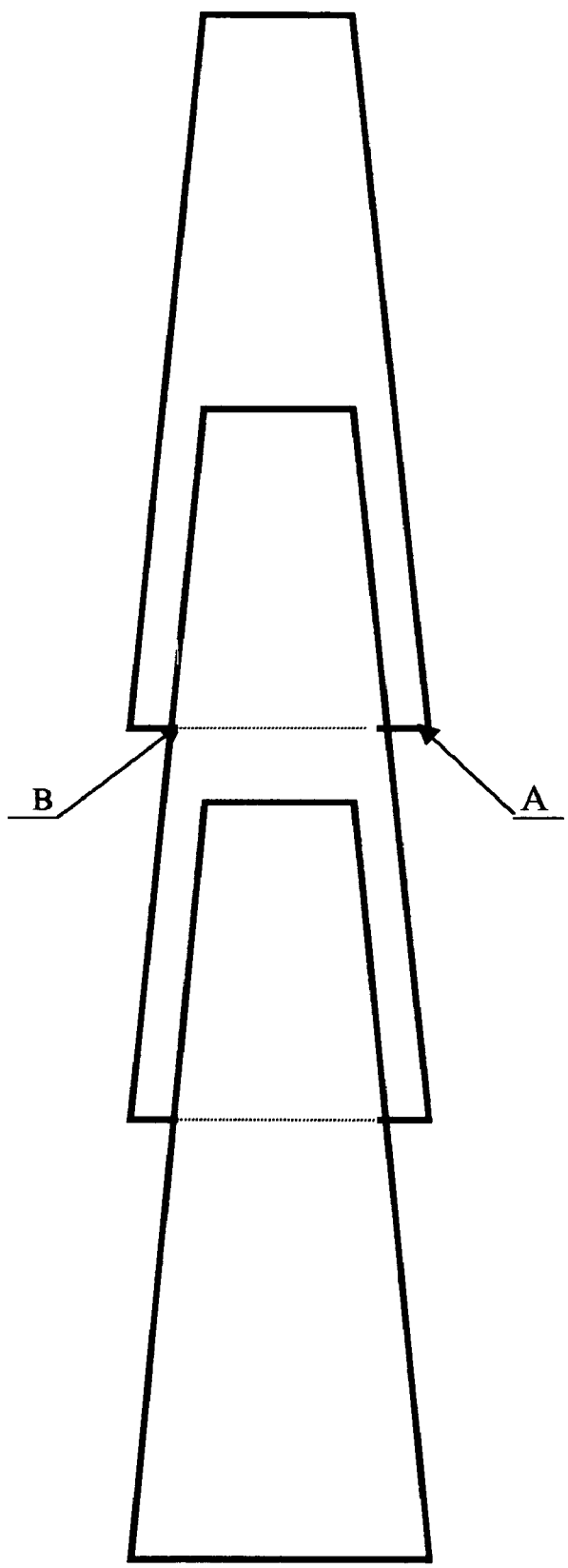
FIG. 2. Side view of boxes stacked (telescoped) for shipment. Page 10.
  A. Interior flanges reduce the inside diameter of the boxes, only slide halfway down the interior box, allowing only 6 boxes per stack.
  B. When the flange is on the inside the flange is forced into the exterior wall of the box inside, creating an indentation the flange is locked into.
Figure 3:
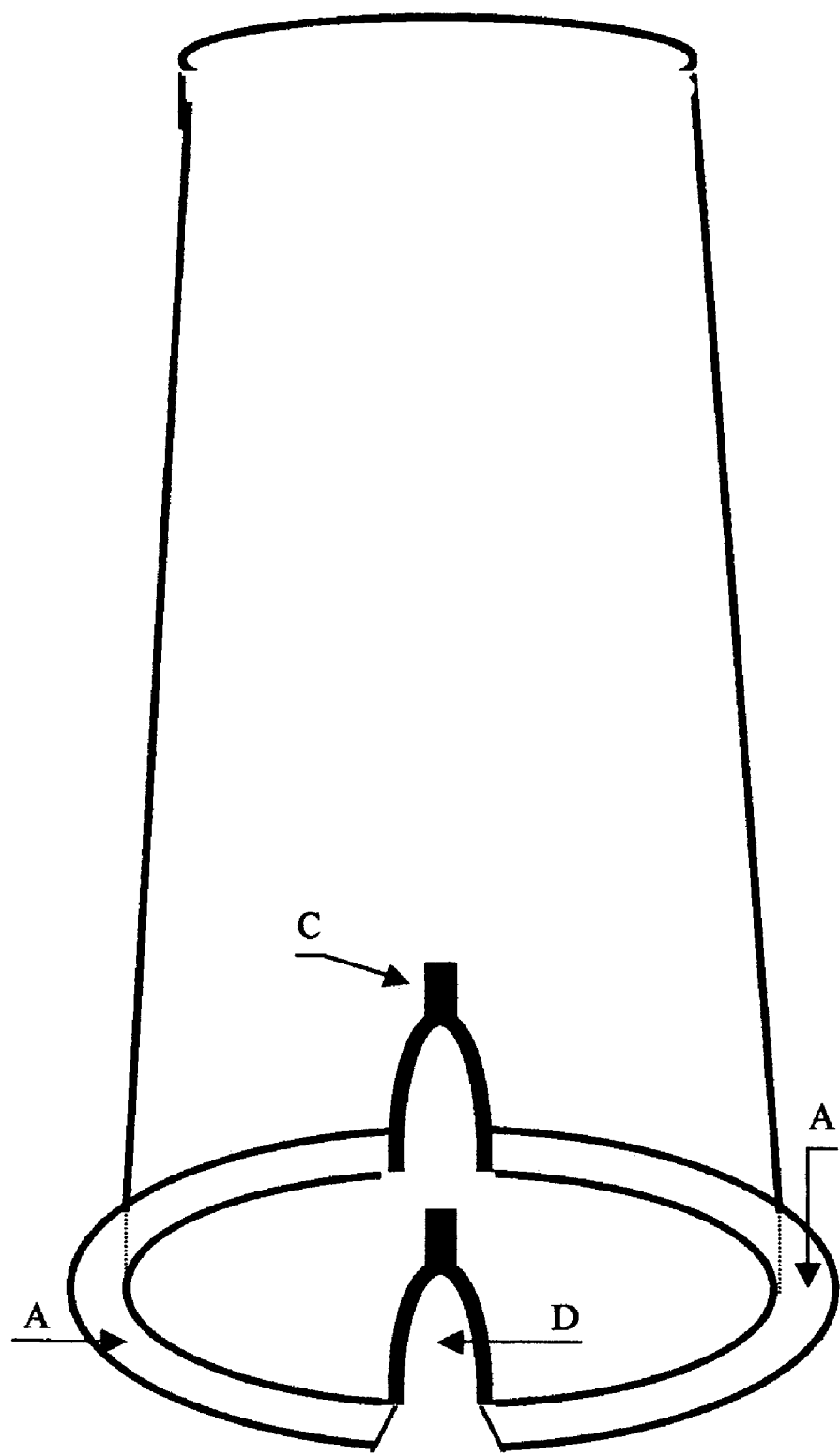
FIG. 3. Tilted on side looking up at base of box. Page 11.
  New round meter box showing the base flange on the outside of the box.
  A. With base flange on the outside, the base inside diameter is increased to a full 24".
Figure 4:
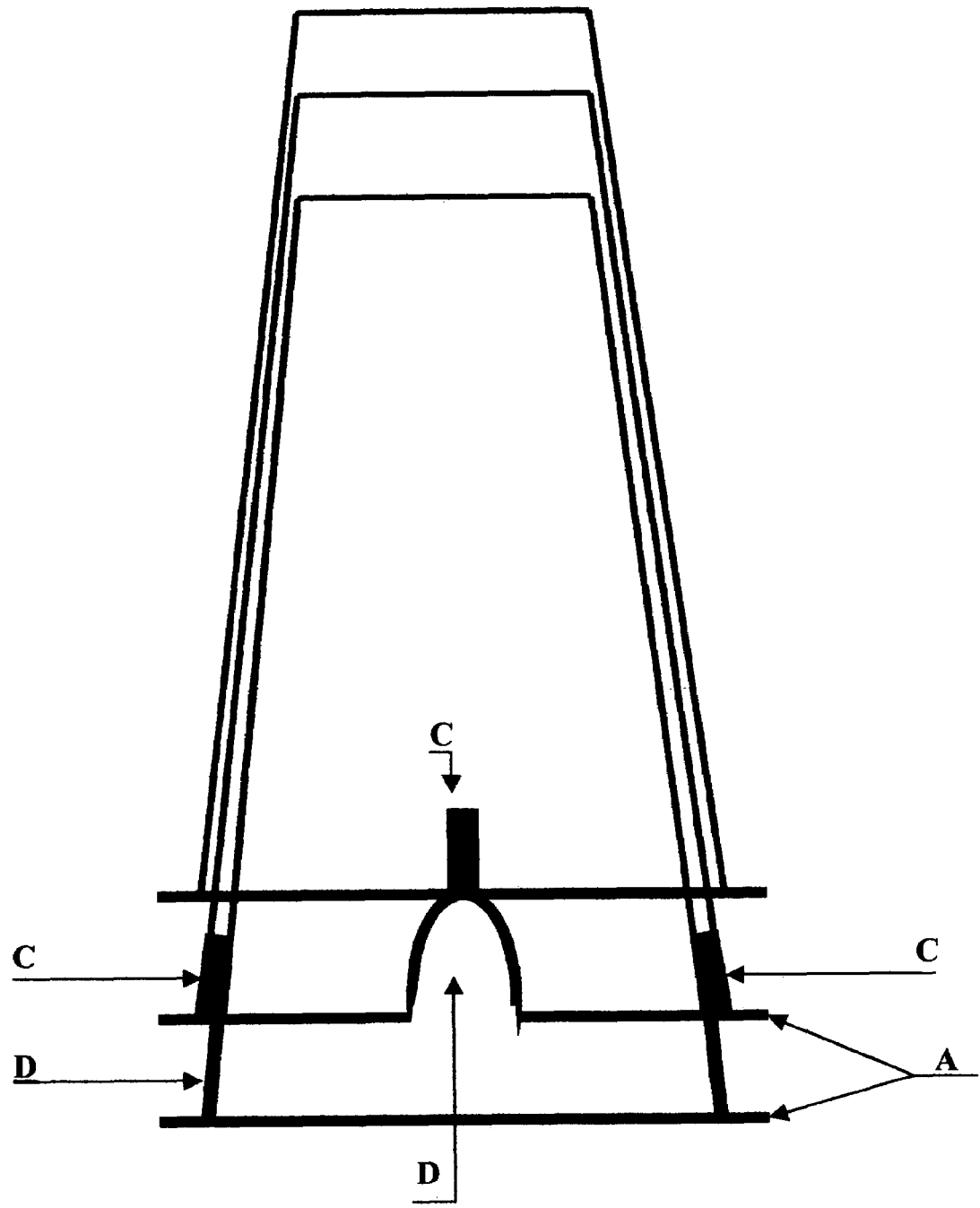

FIG. 4. Shows how new style stacks using friction lugs and mouse hole flange. Page 12.

A. Exterior flange allows outside box to almost completely slide over the inside box.

C. Shows outer box wall separated from the inside box wall by the friction flange.

D. Flange mouse hole. Boxes are rotated 90 degrees so mouse hole will not be over friction lugs.

Figure 5:
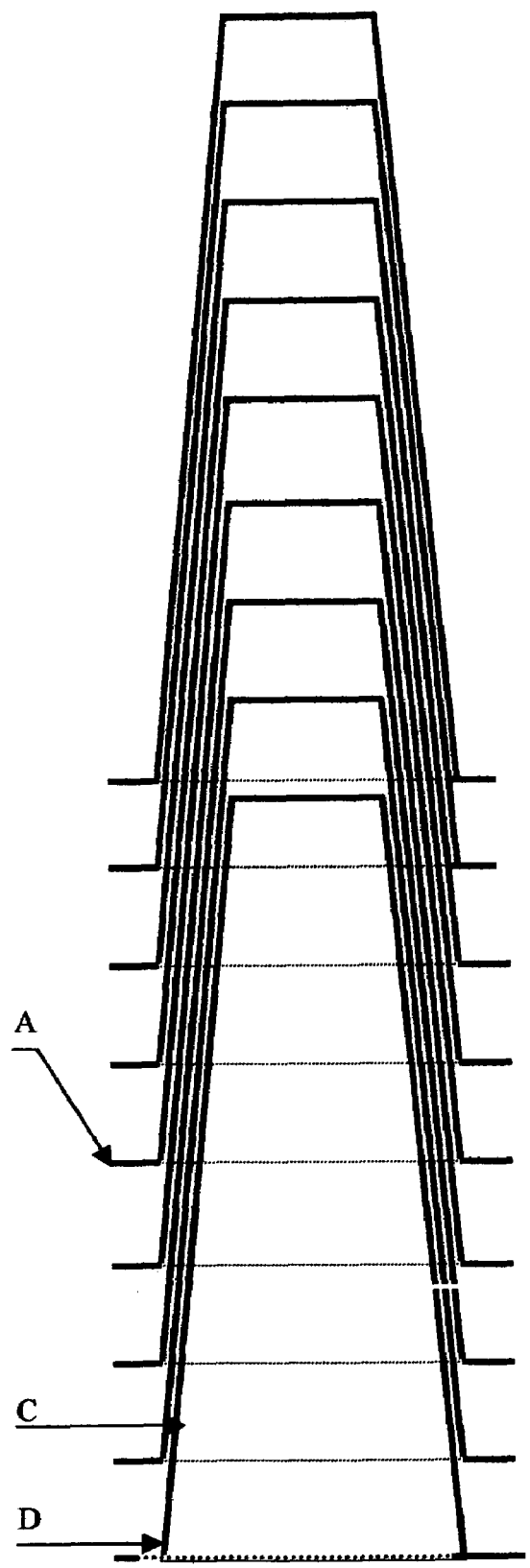

FIG. 5. Side view of boxes stacked (telescoped) for shipment. Page 13.

A. Exterior flange allows over twice as many stacked boxes before the maximum transportation height is reached. Exterior flange also allows for easy separation of boxes.

C. Friction lugs allow easy separation of boxes and provide stability.

D. Mouse hole. (Hole for water pipe to enter water meter box).

DETAILED DESCRIPTION OF THE INVENTION

Flanges are a necessary part of the manufacturing process. Molten resin flows continuously around the box until the mold cavity is filled. As a result the top and base are closed. Top and base are cut away leaving a 1½" flange. The flanges creates an I beam configuration providing the required strength against earth loads trying to implode the box as the soil is replaced around the box and tamped. These boxes are cone shaped so one box slides over the next box in a telescoped configuration so more boxes can be loaded on a trailer for transporting. This mold can be redesigned creating a flange on the outside at the base eliminating the inside flange. With base flange removed from the inside, this base area becomes 3" larger. Now when stacking (telescoping) one box on top of the other, the outside box can slide further down the cone shaped box it is being forced over. Over two times the number of boxes can now be transported on the same size trailer. The cost of fuel required to transport one truckload of boxes from the manufacturing facility to the distributors yard, then from the distributor's yard to the job site is escalating at a rapid pace and will continue to do so. This is an innovative way to ship over twice the amount of product for the same transportation cost and inventory over twice as many boxes in the same yard space.

Also when forcing a new style box one box over another box, without friction lugs, all of the internal surface area of the inside box is forced over all of the outside surface area of the inner box creating friction that makes de-stacking very difficult, time consuming and damages boxes. Friction lugs above the mouse holes on each side at the base cuts down drastically on the amount of area in contact when telescoping. Less area in contact reduces friction the less friction the easier to disassemble. No more damage. Friction Lugs are 3" long by 1" wide and protrude from the meter box 1".

With base flanges on the outside and the friction lugs, the boxes will be much easier to disassemble (de-telescope) once the boxes reach the job site.

I claim:

1. A nesting meter box comprising:
    a conical sleeve having a narrow top, wide bottom and a tapered side wall extending between the top and bottom, said sleeve being oriented vertically upright, said sleeve having a bottom open edge;
    an exterior base flange extending outwardly from side wall of said sleeve and said exterior base flange substantially circumferentially surrounding said bottom open edge;
    an arched shaped opening extending through the exterior base flange and upwardly into the side wall of said sleeve, the opening being arcuate or curved along all points of the opening which are adjacent to the side wall, the arched shaped opening having a maximum width and a central longitudinal axis;
    a friction lug in contact with an upper edge of said arched shaped opening and extending vertically above the arched shaped opening, said friction lug extends outwardly from the side wall of said sleeve, the friction lug has a rectangular profile having a maximum width less than the maximum width of the arched shaped opening, the friction lug is aligned with the central longitudinal axis of the arched shaped opening;
    wherein the meter box is capable of receiving a second identical meter box nested thereabove such that a friction point is provided on an exterior surface of the friction lug of the meter box, the exterior surface of the friction lug is tapered at the same angle of inclination as the taper of the side wall of the conical sleeve along an entire vertical length of the friction lug, where the friction lug is capable of slidingly contacting the inner side wall surface of the second identical meter box.

* * * * *